(12) United States Patent
Moorer et al.

(10) Patent No.: US 7,962,130 B2
(45) Date of Patent: Jun. 14, 2011

(54) PORTABLE DEVICE FOR CONVERGENCE AND AUTOMATION SOLUTION

(75) Inventors: Seale Moorer, Westerville, OH (US);
Eric Eichensehr, Westerville, OH (US);
Kyle Virgin, Westerville, OH (US);
Timothy McMahon, Westerville, OH (US)

(73) Assignee: Exceptional Innovation, Westerville, OH (US)

( * ) Notice: Subject to any disclaimer, the term of this patent is extended or adjusted under 35 U.S.C. 154(b) by 743 days.

(21) Appl. No.: 11/937,889

(22) Filed: Nov. 9, 2007

(65) Prior Publication Data
US 2008/0154398 A1  Jun. 26, 2008

Related U.S. Application Data

(60) Provisional application No. 60/857,774, filed on Nov. 9, 2006.

(51) Int. Cl.
*H04M 3/00* (2006.01)

(52) U.S. Cl. ...... 455/419; 455/420; 455/3.06; 455/3.04; 709/208; 709/246; 709/217; 709/223; 709/227; 709/220

(58) Field of Classification Search .................. 455/419, 455/418, 550.1, 420, 3.06, 3.04; 709/246, 709/208, 217, 223, 227, 220
See application file for complete search history.

(56) References Cited

U.S. PATENT DOCUMENTS

| | | | |
|---|---|---|---|
| 4,567,557 A | 1/1986 | Burns | |
| 4,808,841 A | 2/1989 | Ito et al. | |
| 4,989,081 A | 1/1991 | Masayuki | |
| 5,086,385 A | 2/1992 | Launey et al. | |
| 5,105,186 A * | 4/1992 | May | |
| 5,218,552 A | 6/1993 | Stirk | |
| 5,237,305 A | 8/1993 | Ishijuro | |
| 5,282,028 A * | 1/1994 | Johnson et al. | ............... 725/139 |
| 5,502,618 A | 3/1996 | Chiou | |
| 5,579,221 A | 11/1996 | Mun | |
| 5,598,523 A | 1/1997 | Fujita | |
| 5,621,662 A | 4/1997 | Humphries et al. | |
| 5,623,392 A | 4/1997 | Ma | |
| 5,666,172 A * | 9/1997 | Ida et al. | |
| 5,706,191 A | 1/1998 | Bassett et al. | |
| 5,706,290 A | 1/1998 | Shaw et al. | |
| 5,748,444 A * | 5/1998 | Honda et al. | |
| 5,787,259 A | 7/1998 | Haroun | |
| 5,831,823 A | 11/1998 | Hoedl | |
| 5,850,340 A | 12/1998 | York | |
| 5,877,957 A | 3/1999 | Bennett | |
| 5,922,047 A | 7/1999 | Newlin et al. | |
| 5,956,025 A | 9/1999 | Goulden et al. | |
| 5,956,487 A | 9/1999 | Venkatraman et al. | |
| 6,020,881 A | 2/2000 | Naughton et al. | |
| 6,029,092 A | 2/2000 | Stein | |
| 6,061,602 A | 5/2000 | Meyer | |
| 6,112,127 A | 8/2000 | Bennett | |
| 6,139,177 A | 10/2000 | Venkatraman et al. | |

(Continued)

*Primary Examiner* — Kwasi Karikari
(74) *Attorney, Agent, or Firm* — McGuireWoods LLP

(57) ABSTRACT

A convergence and automation system (CAS) includes an internet-protocol (IP) based network implemented with a web service for devices (WSD) protocol, devices connected to the network, each configured to perform at least one service, a server implemented with the WSD protocol, connected to the network and configured to control the devices to converge and automate the services thereof, and a portable device implemented with the WSD protocol, connected to the network and configured to control the devices and perform the services. The server is implemented with Windows Sideshow to collect information necessary for controlling the devices and provides the collected information to the portable device.

22 Claims, 6 Drawing Sheets

U.S. PATENT DOCUMENTS

| | | | |
|---|---|---|---|
| 6,147,601 A | 11/2000 | Sandelman et al. | |
| 6,154,681 A | 11/2000 | Drees et al. | |
| 6,160,477 A | 12/2000 | Sandelman et al. | |
| 6,175,872 B1 * | 1/2001 | Neumann et al. | |
| 6,182,094 B1 | 1/2001 | Humpleman et al. | |
| 6,192,282 B1 | 2/2001 | Smith et al. | |
| 6,198,479 B1 | 3/2001 | Humpleman et al. | |
| 6,201,523 B1 * | 3/2001 | Akiyama et al. | |
| 6,222,729 B1 * | 4/2001 | Yoshikawa | |
| 6,243,707 B1 | 6/2001 | Humpleman et al. | |
| 6,263,260 B1 | 7/2001 | Bodmer et al. | |
| 6,275,922 B1 | 8/2001 | Bertsch | |
| 6,278,676 B1 | 8/2001 | Anderson et al. | |
| 6,288,716 B1 | 9/2001 | Humpleman et al. | |
| 6,313,990 B1 * | 11/2001 | Cheon | |
| 6,314,326 B1 | 11/2001 | Fuchu | |
| 6,353,853 B1 | 3/2002 | Gravlin | |
| 6,385,495 B1 | 5/2002 | Bennett | |
| 6,389,331 B1 | 5/2002 | Jensen et al. | |
| 6,402,109 B1 * | 6/2002 | Dittmer | |
| 6,405,103 B1 | 6/2002 | Ryan et al. | |
| 6,456,892 B1 | 9/2002 | Dara-Abrams et al. | |
| 6,462,654 B1 | 10/2002 | Sandelman et al. | |
| 6,473,661 B1 | 10/2002 | Wollner | |
| 6,496,575 B1 | 12/2002 | Vasell et al. | |
| 6,522,346 B1 | 2/2003 | Meyer | |
| 6,523,696 B1 | 2/2003 | Saito et al. | |
| 6,526,581 B1 | 2/2003 | Edson | |
| 6,546,419 B1 * | 4/2003 | Humpleman | |
| 6,580,950 B1 | 6/2003 | Johnson et al. | |
| 6,587,739 B1 | 7/2003 | Abrams et al. | |
| 6,609,038 B1 | 8/2003 | Croswell et al. | |
| 6,615,088 B1 | 9/2003 | Myer et al. | |
| 6,633,781 B1 | 10/2003 | Lee et al. | |
| 6,640,141 B2 | 10/2003 | Bennett | |
| 6,663,781 B1 | 12/2003 | Huling | |
| 6,690,411 B2 | 2/2004 | Naidoo et al. | |
| 6,690,979 B1 | 2/2004 | Smith | |
| 6,735,619 B1 | 5/2004 | Sawada | |
| 6,756,998 B1 | 6/2004 | Bilger | |
| 6,763,040 B1 | 7/2004 | Hite et al. | |
| 6,778,868 B2 | 8/2004 | Imamura et al. | |
| 6,782,294 B2 | 8/2004 | Reich et al. | |
| 6,792,319 B1 | 9/2004 | Bilger | |
| 6,792,323 B2 | 9/2004 | Krzyzanowski et al. | |
| 6,792,480 B2 | 9/2004 | Chaiken et al. | |
| 6,823,223 B2 | 11/2004 | Gonzales et al. | |
| 6,834,208 B2 | 12/2004 | Gonzales et al. | |
| 6,838,978 B2 | 1/2005 | Aizu et al. | |
| 6,845,275 B2 | 1/2005 | Gasiorek et al. | |
| 6,850,149 B2 | 2/2005 | Park | |
| 6,859,669 B2 | 2/2005 | An | |
| 6,865,428 B2 | 3/2005 | Gonzales et al. | |
| 6,868,292 B2 | 3/2005 | Ficco | |
| 6,868,293 B1 | 3/2005 | Schurr et al. | |
| 6,870,555 B2 | 3/2005 | Sekiguchi | |
| 6,891,838 B1 * | 5/2005 | Petite et al. ............ 370/401 | |
| 6,909,921 B1 | 6/2005 | Bilger | |
| 6,912,429 B1 | 6/2005 | Bilger | |
| 6,924,727 B2 | 8/2005 | Nagaoka et al. | |
| 6,928,576 B2 | 8/2005 | Sekiguchi | |
| 6,930,599 B2 | 8/2005 | Naidoo et al. | |
| 6,957,110 B2 | 10/2005 | Wewalaarachchi et al. | |
| 6,957,275 B1 | 10/2005 | Sekiguchi | |
| 6,961,763 B1 | 11/2005 | Wang et al. | |
| 6,965,935 B2 | 11/2005 | Diong | |
| 6,967,565 B2 | 11/2005 | Lingermann | |
| 6,980,868 B2 | 12/2005 | Huang et al. | |
| 6,990,379 B2 | 1/2006 | Gonzales et al. | |
| 7,047,092 B2 | 5/2006 | Wimsatt | |
| 7,130,719 B2 | 10/2006 | Ehlers et al. | |
| 7,136,709 B2 | 11/2006 | Arling et al. | |
| 7,170,422 B2 | 1/2007 | Nelson et al. | |
| 7,174,385 B2 | 2/2007 | Li | |
| 7,200,683 B1 | 4/2007 | Wang et al. | |
| 7,201,356 B2 | 4/2007 | Huang | |
| 7,203,486 B2 | 4/2007 | Patel | |
| 7,225,037 B2 | 5/2007 | Shani | |
| 7,260,604 B2 | 8/2007 | Kuki | |
| 7,370,280 B2 | 5/2008 | Ho et al. | |
| 7,380,250 B2 | 5/2008 | Schechter et al. | |
| 7,453,685 B2 | 11/2008 | Lube | |
| 7,505,889 B2 | 3/2009 | Salmonsen et al. | |
| 2001/0034754 A1 * | 10/2001 | Elwahab et al. | |
| 2001/0036192 A1 * | 11/2001 | Chiles et al. | |
| 2001/0039460 A1 | 11/2001 | Aisa | |
| 2002/0000092 A1 * | 1/2002 | Sharood et al. | |
| 2002/0016639 A1 | 2/2002 | Smith | |
| 2002/0029085 A1 | 3/2002 | Park | |
| 2002/0031120 A1 | 3/2002 | Rakib | |
| 2002/0033760 A1 | 3/2002 | Kobayashi | |
| 2002/0035404 A1 | 3/2002 | Ficco et al. | |
| 2002/0044042 A1 | 4/2002 | Christensen | |
| 2002/0047774 A1 | 4/2002 | Christensen | |
| 2002/0073183 A1 | 6/2002 | Yoon et al. | |
| 2002/0111698 A1 | 8/2002 | Graziano et al. | |
| 2002/0126443 A1 | 9/2002 | Zodnik | |
| 2002/0152311 A1 | 10/2002 | Veltman et al. | |
| 2002/0165953 A1 | 11/2002 | Diong | |
| 2002/0174178 A1 | 11/2002 | Stawikowski | |
| 2002/0180579 A1 | 12/2002 | Nagaoka et al. | |
| 2002/0194328 A1 | 12/2002 | Hallenbeck | |
| 2002/0196158 A1 | 12/2002 | Lee | |
| 2003/0009515 A1 | 1/2003 | Lee et al. | |
| 2003/0009537 A1 | 1/2003 | Wang | |
| 2003/0028270 A1 | 2/2003 | Peterson et al. | |
| 2003/0033028 A1 | 2/2003 | Bennett | |
| 2003/0034898 A1 * | 2/2003 | Shamoon et al. ......... 340/825.72 | |
| 2003/0037166 A1 | 2/2003 | Ueno et al. | |
| 2003/0040812 A1 | 2/2003 | Gonzales et al. | |
| 2003/0040813 A1 | 2/2003 | Gonzales et al. | |
| 2003/0040819 A1 | 2/2003 | Gonzales | |
| 2003/0065407 A1 * | 4/2003 | Johnson et al. | |
| 2003/0069887 A1 | 4/2003 | Lucovsky et al. | |
| 2003/0074088 A1 | 4/2003 | Gonzales | |
| 2003/0083758 A1 | 5/2003 | Williamson | |
| 2003/0101304 A1 | 5/2003 | King et al. | |
| 2003/0198938 A1 | 10/2003 | Murray | |
| 2003/0200009 A1 | 10/2003 | von Kannewurff | |
| 2003/0233432 A1 | 12/2003 | Davis et al. | |
| 2004/0003051 A1 * | 1/2004 | Krzyzanowski et al. | |
| 2004/0004810 A1 | 1/2004 | Kim | |
| 2004/0010327 A1 | 1/2004 | Terashima et al. | |
| 2004/0010561 A1 | 1/2004 | Kim | |
| 2004/0039459 A1 | 2/2004 | Daugherty et al. | |
| 2004/0092282 A1 * | 5/2004 | Kim et al. | |
| 2004/0133314 A1 | 7/2004 | Ehlers | |
| 2004/0138768 A1 | 7/2004 | Murray | |
| 2004/0143629 A1 * | 7/2004 | Bodin et al. | |
| 2004/0176877 A1 | 9/2004 | Hesse | |
| 2004/0213384 A1 | 10/2004 | Alles | |
| 2004/0215694 A1 | 10/2004 | Podolsky | |
| 2004/0215778 A1 | 10/2004 | Hesse et al. | |
| 2004/0215816 A1 | 10/2004 | Hayes et al. | |
| 2004/0237107 A1 | 11/2004 | Staples | |
| 2004/0243257 A1 | 12/2004 | Theimer | |
| 2004/0249922 A1 | 12/2004 | Hackman | |
| 2004/0260407 A1 | 12/2004 | Wimsatt | |
| 2004/0260427 A1 | 12/2004 | Wimsatt | |
| 2004/0267385 A1 | 12/2004 | Lingemann | |
| 2004/0267876 A1 | 12/2004 | Kakivaya et al. | |
| 2004/0267909 A1 | 12/2004 | Autret | |
| 2005/0009498 A1 | 1/2005 | Ho | |
| 2005/0021805 A1 * | 1/2005 | De Petris et al. | |
| 2005/0035717 A1 | 2/2005 | Adamson | |
| 2005/0038708 A1 | 2/2005 | Wu | |
| 2005/0044225 A1 | 2/2005 | Ota et al. | |
| 2005/0055108 A1 | 3/2005 | Gonzales | |
| 2005/0071419 A1 * | 3/2005 | Lewontin | |
| 2005/0080879 A1 | 4/2005 | Kim et al. | |
| 2005/0085930 A1 | 4/2005 | Gonzales | |
| 2005/0090915 A1 | 4/2005 | Geiwitz | |
| 2005/0096753 A1 | 5/2005 | Arling et al. | |
| 2005/0107897 A1 | 5/2005 | Callaghan | |
| 2005/0108091 A1 | 5/2005 | Sotak | |
| 2005/0113021 A1 | 5/2005 | Gosieski, Jr. et al. | |
| 2005/0113943 A1 | 5/2005 | Nian | |

| | | | | | | |
|---|---|---|---|---|---|---|
| 2005/0119767 A1 | 6/2005 | Kiwimagi et al. | | 2006/0020353 A1 | 1/2006 | Gonzales et al. |
| 2005/0119793 A1 | 6/2005 | Amundson et al. | | 2006/0053234 A1 | 3/2006 | Kumar et al. |
| 2005/0125083 A1 | 6/2005 | Kiko | | 2006/0058900 A1 | 3/2006 | Johanson et al. |
| 2005/0131551 A1 | 6/2005 | Ruutu | | 2006/0069934 A1 * | 3/2006 | Esch et al. .......... 713/300 |
| 2005/0131553 A1 | 6/2005 | Yoon et al. | | 2006/0106933 A1 | 5/2006 | Huang et al. |
| 2005/0131558 A1 | 6/2005 | Braithwaite | | 2006/0118694 A1 | 6/2006 | Lee et al. |
| 2005/0132405 A1 | 6/2005 | AbiEzzi | | 2006/0126646 A1 * | 6/2006 | Bedingfield, Sr. |
| 2005/0149758 A1 * | 7/2005 | Park | | 2006/0155802 A1 | 7/2006 | He et al. |
| 2005/0159823 A1 | 7/2005 | Hayes et al. | | 2007/0053376 A1 | 3/2007 | Oshima et al. |
| 2005/0172056 A1 | 8/2005 | Ahn | | 2007/0073419 A1 | 3/2007 | Sesay |
| 2005/0198063 A1 | 9/2005 | Thomas et al. | | 2007/0083679 A1 | 4/2007 | Kikuchi |
| 2005/0198188 A1 | 9/2005 | Hickman | | 2007/0104332 A1 | 5/2007 | Clemens et al. |
| 2005/0198304 A1 | 9/2005 | Oliver et al. | | 2007/0153459 A1 | 7/2007 | Wohlford et al. |
| 2005/0232583 A1 | 10/2005 | Kubota | | 2007/0162567 A1 | 7/2007 | Ding |
| 2005/0262227 A1 | 11/2005 | Heller et al. | | 2007/0203979 A1 | 8/2007 | Walker |
| 2005/0267605 A1 | 12/2005 | Lee et al. | | 2007/0247800 A1 | 10/2007 | Smith et al. |
| 2005/0271355 A1 * | 12/2005 | Gilor | | 2008/0108439 A1 | 5/2008 | Cole |
| 2006/0004920 A1 | 1/2006 | Hallenbeck | | | | |
| 2006/0009861 A1 | 1/2006 | Bonasia et al. | | * cited by examiner | | |

PORTABLE DEVICE FOR CONVERGENCE AND AUTOMATION SOLUTION

CROSS REFERENCE TO PRIOR APPLICATIONS

This application claims priority and the benefit thereof from U.S. Provisional Application Ser. No. 60/857,774 filed Nov. 9, 2006, which is hereby incorporated by reference for all purposes as if fully set forth herein.

BACKGROUND OF THE INVENTION

1. Field of the Invention

The invention is directed to a convergence and automation solution, and particularly to a portable device for remote control, communications and media consumption for such a convergence and automation solution.

2. Related Art

Household, academic and business spaces now more commonly have more than one audio or video device such as CD/DVD player, portable MP3 player, tuner, preamp, power amp, speakers, VCR, DVR, computers running media players or the like connected to some other source of audio or video (i.e. internet radio, satellite radio and the like), etc. Typically, a CD/DVD player from one company comes with its own remote control and an amplifier by an entirely different company comes with its own remote control. The same space may have a PC with its keyboard and mouse, and yet another company's portable MP3 player with its own control switches. While each audio device is doing precisely what it was designed to do, each operates completely independent from the others with the possible exception of the portable MP3 player, which is connected to a PC for synchronization. As a result, a user ends up running from one keypad to another or juggling a series of remote controls to operate the various devices.

Since these audio/video devices are not designed to communicate with each other or their communication is very limited, access to these audio/video devices is limited by their physical locations. For example, it is very difficult to play an MP3 file saved in a PC hard disk drive in, for example, a child's bedroom on the speakers located in, for example, an entertainment room. Thus, it becomes difficult for a user to enjoy music of his or her choice whenever and wherever he or she wants because these devices cannot be connected and/or accessed from more than one room.

Accordingly, there is a need for a solution for the aforementioned accessibility, connectability and convergence issues that allows a user to enjoy all their digital content and control all of the devices that are a source this digital content.

SUMMARY OF THE INVENTION

The invention meets the foregoing need by providing a convergence and automation system with a portable multi-functional device for remote control, communication and media consumption, which solves the accessibility, connectability and convergence issues and further involves other advantages apparent from the discussion herein.

According to one aspect of the invention, a convergence and automation system includes an internet-protocol (IP) based network implemented with a web service for devices (WSD) protocol, a plurality of devices connected to the network, each device being configured to perform at least one of a plurality of services, a server implemented with the WSD protocol, connected to the network and configured to control the devices to converge and automate the plurality of services thereof, and a portable device implemented with the WSD protocol, connected to the network and configured to control at least one of the plurality of devices and perform at least one of the plurality of services. The server is implemented with Windows Sideshow to collect information necessary for controlling the at least one of the plurality of devices and provides the collected information to the portable device.

The services may include at least one of a media service, communication service, lighting service, security service and HVAC service. The communication service may include at least one of an intercom service, email service, web browsing service and a VoIP phone service. The devices may be selected from the group consisting of an audio device, video device, intercom device, lighting control device, security device and HVAC device.

The convergence and automation system may further include least one client implemented with the WSD protocol, connected to the network and configured to control at least a portion of the services of the devices. The client may be selected from the group consisting of a television, personal computer, personal data assistant and remote control.

The portable device may include a dual core-based chipset. The portable device may be connected to the IP network wirelessly. The portable device may be connected to the IP network via a universal serial bus (USB) connection. The convergence and automation system may further include a docking unit configured to charge the portable device and establish the USB connection between the IP network and the portable device.

According to another aspect of the invention, a portable device in communication with a server via an internet-protocol (IP) based network implemented with a web service for devices (WSD) protocol to perform at least one of a plurality of services and control at least one of a plurality of devices, the server implemented with Windows Sideshow to collect information for controlling the plurality of devices and providing the collected information to the portable device, each device configured to perform at least one of the plurality of services, includes a network interface unit configured to connect the portable device to the network, a video unit configured to display the information from the server, an audio unit configured to generate a sound when required for performing the at least one of the plurality of the services, an input unit configured to receive a user's input for performing the at least one of the plurality of services and controlling at least one of the plurality of devices.

The plurality of services may include at least one of a media service, a communication service, a lighting service, a security service and a HVAC service. The communication service may include at least one of an intercom service, email service, web browsing service and a VoIP phone service.

The portable device may further include a processing unit having a dual core-based chipset. The portable device may further include a wireless communication unit for connecting the network interface unit to the network wirelessly. The portable device may further include a universal serial bus (USB) port connected to the network interface unit for connecting the network interface unit to the network. The portable device may further include a power supply unit configured to receive a power from an external power source via the USB port. The power supply unit may include a rechargeable battery.

The portable device may further include a housing configured to engage a docking unit provided for at least one of connecting the portable device to the network and receiving the power from the external power source. The portable device may further include a data storage unit. The data storage unit may include a removable data storage media. The input unit may include at least one of a keyboard and a touch screen. The audio unit may include at least one of a microphone, a speaker and a headphone Jack. The portable device may be configured to automatically or manually enter a sleep mode.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION OF THE INVENTION

Figure 1:
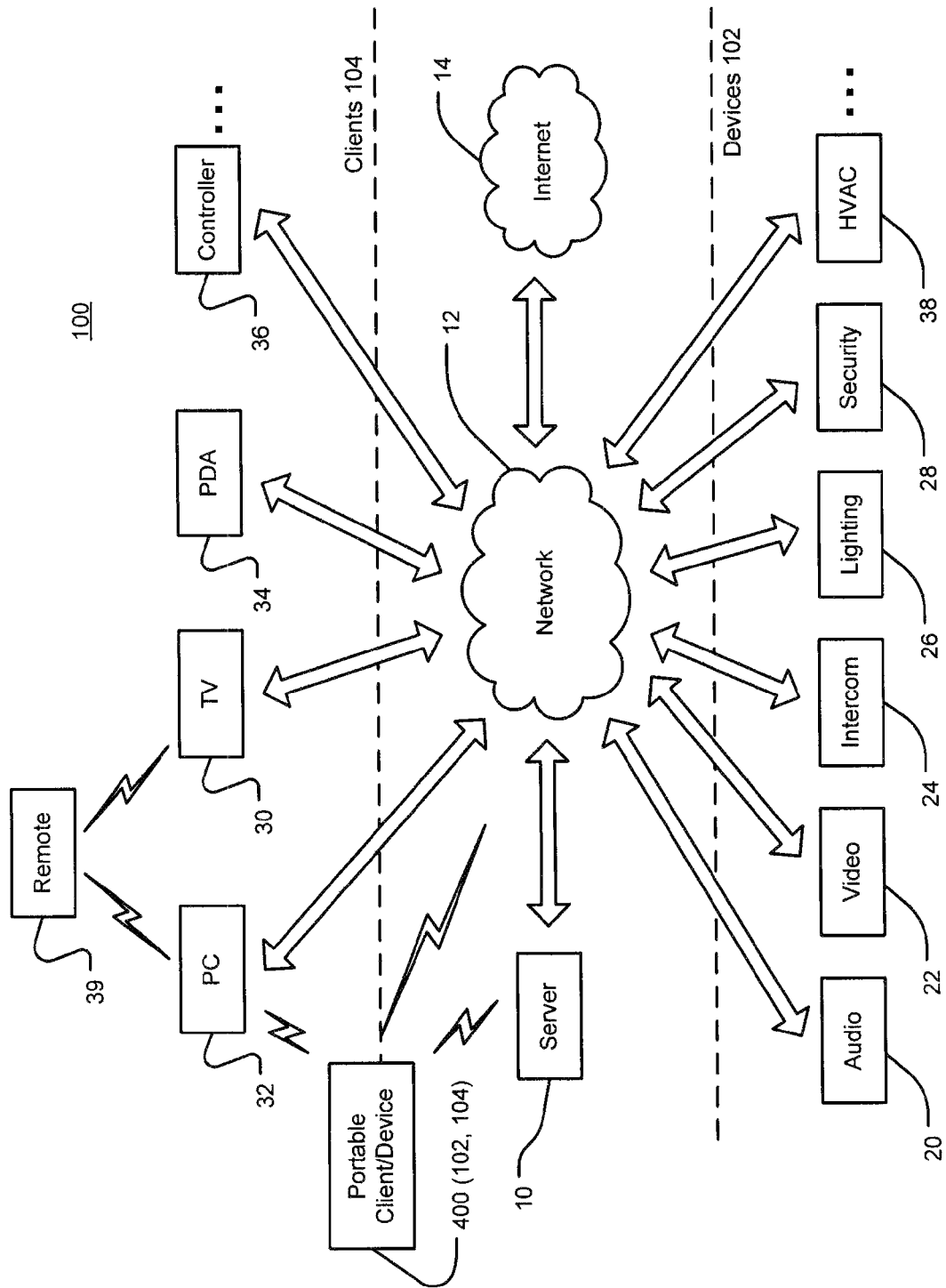
FIG. 1 shows an overview of a convergence and automation solution (CAS) for use with a portable device for remote control, communications and media consumption constructed according to the principles of the invention.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

FIG. 1 shows an overview of a convergence and automation solution (CAS) 100 for use with a portable device 400 for remote control, communications, media consumption and the like, constructed according to the principles of the invention. The CAS 100 may be a combination of hardware and software. The hardware may include a server 10 connected to a network 12 (e.g. IP based wired or wireless network such as an Ethernet network or WLAN) and may possibly be connected to the internet 14, devices 102 (e.g. audio 20, video 22, intercom 24, lighting 26, security system 28, HVAC 38, and the like) and clients 104 (e.g. TV 30, personal computer (PC) 32, personal digital assistance (PDA) 34, controller 36 such as a control panel, game controller (i.e. XBox™, not shown) and the like). The TV 30 and the PC 32 may be provided with a remote controller 39. The server 10 may be any type of computer, such as a PC connected to the network 12. The clients 104 such as clients 30, 32, 34, 36 provide a user with control over the devices 102 such as devices 20, 22, 24, 26, 28, 38. Moreover, the CAS 100 may include the portable device 400 or the like for remote control, communications and media consumption, which may be configured to function as both the device 102 and the client 104.

The software (i.e. applications) enables the hardware (e.g., server 10, devices 102, clients 104 and portable device 400) to communicate with each other despite their different proprietary languages and communication protocols, and may provide the user with control over most or all the hardware from any of the clients 104 and/or portable device 400. The application may utilize at least one portion of the hardware to send commands to the devices 102 and receive feedback from them. The application integrates centralized device control into a PC based media environment (e.g., Microsoft Windows XP Media Center™, Microsoft Windows Vista™ environment, its equivalent or future equivalent thereof) that may store, organize and play digital media content. The user may use the portable device 400 to interact with the devices 102 to listen to music, watch and record television, enjoy family photographs and home movies, as well as adjust the lighting, secure the home, adjust the temperature, distribute music throughout the house, check surveillance cameras and the like. Moreover, the portable device 400 has further communication features as noted below.

The application may be implemented with Web Services. Web Services use standard Internet protocol (IP) and are based on standard XML-related technologies such as SOAP (Simple Object Access Protocol) for communications and WSDL (Web Services Device Language) to describe interfaces. The devices implemented with Web Service for Device (WSD) become black boxes on the network, providing services to any application, on any platform, written in any language. Moreover, the use of WSD allows for the capabilities of Universal Plug and Play (UPnP) that seamlessly connects and simply implementation as is known in the art.

Alternatively or additionally, if the server 10 or the PC 32 is running a SideShow™ enabled operating system such as Microsoft Windows Vista™, the devices 102 may be configured as a SideShow™ device or "gadget." A SideShow™ device or gadget may communicate with any of the clients 104 or devices 102 implemented with WSD in the network via protocols according to SideShow™ XML communication specifications. Moreover, the server 10 or the PC 32 using Microsoft Windows Vista™ may be running a SideShow™ gadget application running on the Microsoft Windows Vista™ computer providing a user interface rendering for the device that communicates with automation control devices via WSD technology.

Alternatively or additionally, the WSD technology may be implemented using Device Profile for Web Services (DPWS). The DPWS may be used to define how various devices may be able to use Web Services in conjunction with the convergence solution noted above. The DPWS further may allow and/or ensure interoperability between the various devices 102 and the clients 104 and the like. Moreover, the DPWS may allow for support of resource constrained devices within the convergence solution shown in FIG. 1. One benefit of DPWS is its ability to enable device and service discovery within the convergence solution of FIG. 1. The DPWS may allow for and support rich eventing, an end point, and may be built on standards and WS specifications. More specifically, the end point may provide device/host metadata. Additionally, the DPWS specifications may include HTTP, WSDL, SOAP, WS-Discovery, WS-Addressing, WS-Eventing, WS-metadata, transfer, and the like.

Figure 2:
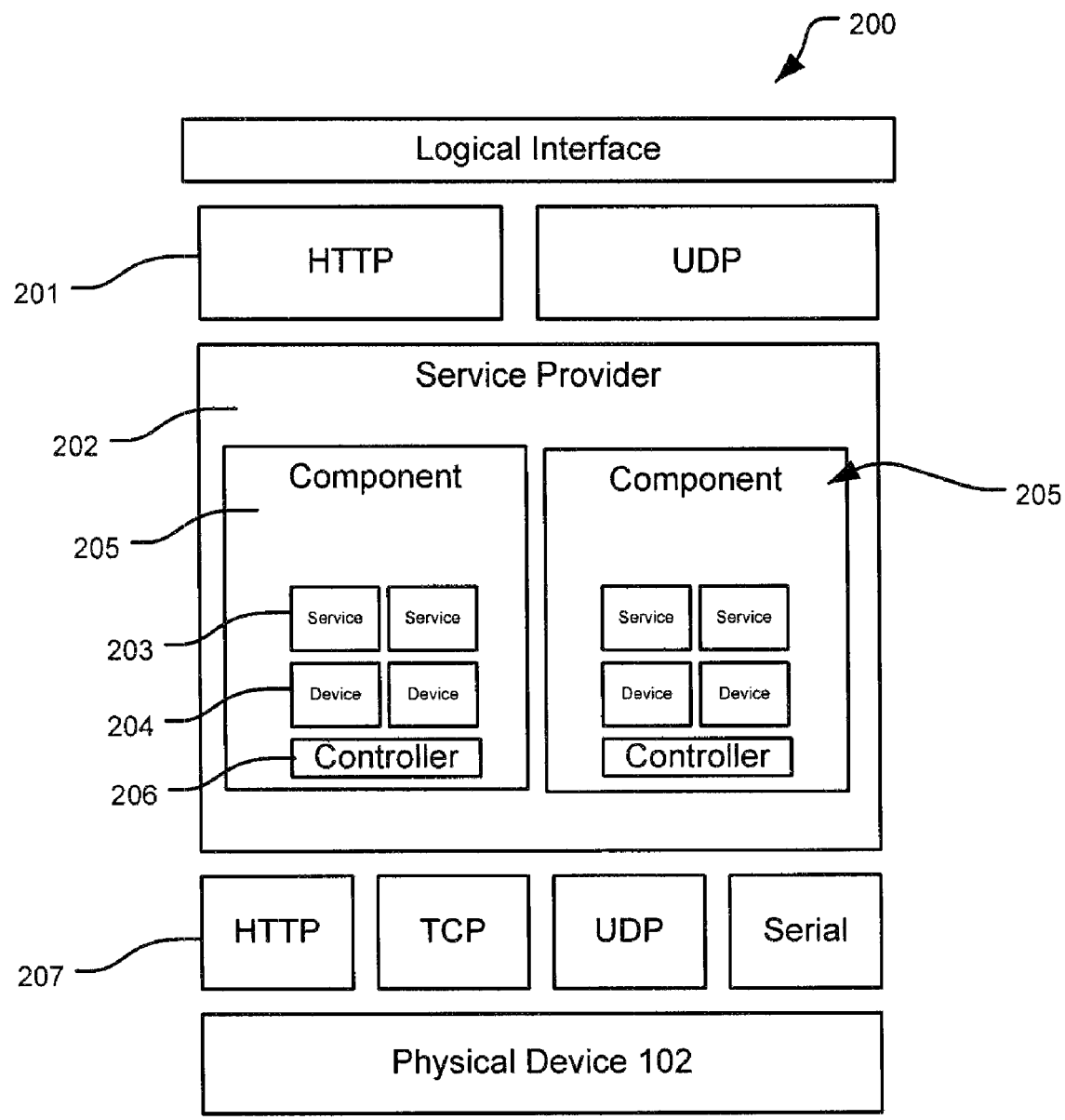
FIG. 2 schematically shows the web services for devices stack for use in the CAS of FIG. 1, constructed according to principles of the invention.

FIG. 2 schematically shows the Web Services for Devices (WSD) Stack for use in the CAS shown in FIG. 1, constructed according to the principles in the invention. The WSD stack as referenced herein refers to the protocol architecture. In particular, FIG. 2 shows the WSD Stack 200. The WSD stack 200 of the invention is a particular automation software implementation of a Web Services computer networking protocol suite. The individual protocols are designed with a single purpose in mind. Because each protocol module may only communicate with two others, the modules are commonly analized as layers in a stack of protocols. The lowest protocol always deals with "low-level," physical interaction of the hardware. Every higher layer adds more features. As described in greater detail below, the WSD Stack 200 allows and enables the discovery of devices in a network, such as the convergence solution of FIG. 1 and the devices on the network in a light weight, simple fashion. Using the WSD Stack 200, any of the devices 102 in the network is able to send a message to determine what services are available enabling discovery of the device 102.

The WSD Stack 200 is the software that may be used to process protocols. The WSD Stack 200 is required to use a specific set of protocols. In particular, the WSD Stack 200 leverages Web Services for Devices to create a powerful, extensible system that may communicate with a wide variety of devices 102 described in greater detail above. As shown in FIG. 2, the WSD Stack is shown schematically at a high level. The WSD Stack 200 in FIG. 2 shows the communication to and from clients 104 at the top of the diagram via a logical interface and the various hardware devices 102 arranged at the very bottom of the stack 200 of FIG. 2.

The logical interface initially communicates with and through the WSD Stack 200 via a Hyper Text Transfer Protocol (HTTP) or a User Datagram Protocol (UDP) as indicated by reference numeral 201. The HTTP enables data transfer and display of web pages and the like as is well known in the art. The UDP enables a direct way to send and receive datagrams on an IP network as is well known in the art. Accordingly, the clients 104 interface via the logical interface through one or both of the HTTP and UDP layers 201 to a service provider 202. For example, communication from the client 104 to the service provider 202 may be via the HTTP or UDP information and the communication may be contained in SOAP packets.

The service provider 202 may be configured as a large, generic host for web services. The service provider 202 may host one or more components 205 therein. A component 205 may have the ability to host multiple services. However, the component 205 may limit the relationship between a service and a device to a one-to-one relationship.

A further part of the component 205 is the web service 203. The web service 203 exists for each device 204. The web service 203 may be configured as a generic web service based on the device category. For example, a thermostat has a corresponding web service based on the HVAC category for example only.

Each web service 203 may be configured with a device bridge 204. The device bridge 204 may be configured to essentially translate commands by the physical devices 102. Accordingly, each device bridge 204 may be specific to the specific make of the physical device 102.

The service provider 203 may further include a controller 206. The controller 206 may be arranged to communicate with the devices 102. The controller 206 may be configured to have a ratio of one controller per component 205. The controller 206 may include the ability to send feedback from the devices 102 to the component 204. The component 204 may then route the feedback to the appropriate web service 203. Accordingly, this arrangement provides the ability for feedback from the devices 102 to various clients 104.

The service provider 202 next may communicate to the various physical devices 102 via one or more of a plurality of different communications protocol 207. In particular, the communications protocol with the devices 102 may include any type of native or proprietary format. Such native or proprietary formats may be sent via Hyper Text Transfer Protocol (HTTP), transmission control protocol (TCP), user datagram protocol (UDP), serial protocols or the like. The TCP enables two hosts to connect. The serial protocol provides one or two way serial communication as is well known in the art.

Accordingly, the WSD Stack 200 creates a powerful and extensible system based on web services for devices. Moreover, the WSD Stack 200 may communicate with a wide variety of devices 102 as discussed in detail with respect to FIG. 1 above. Using the WSD Stack 200 allows network components to become "black box" components. This allows the various clients 104 and devices 102 to communicate in a clearly defined way without needing to know how they are accomplishing their various tasks. Using the WSD Stack 200 allows components to be implemented on any application running on any platform and written in any language. In essence, when the WSD Stack 200 is implemented, the network location and communications are handled by the platform, allowing application developers to focus solely on application problems. It should be noted that various modifications to the WSD Stack 200 are contemplated by the invention.

Figure 3:
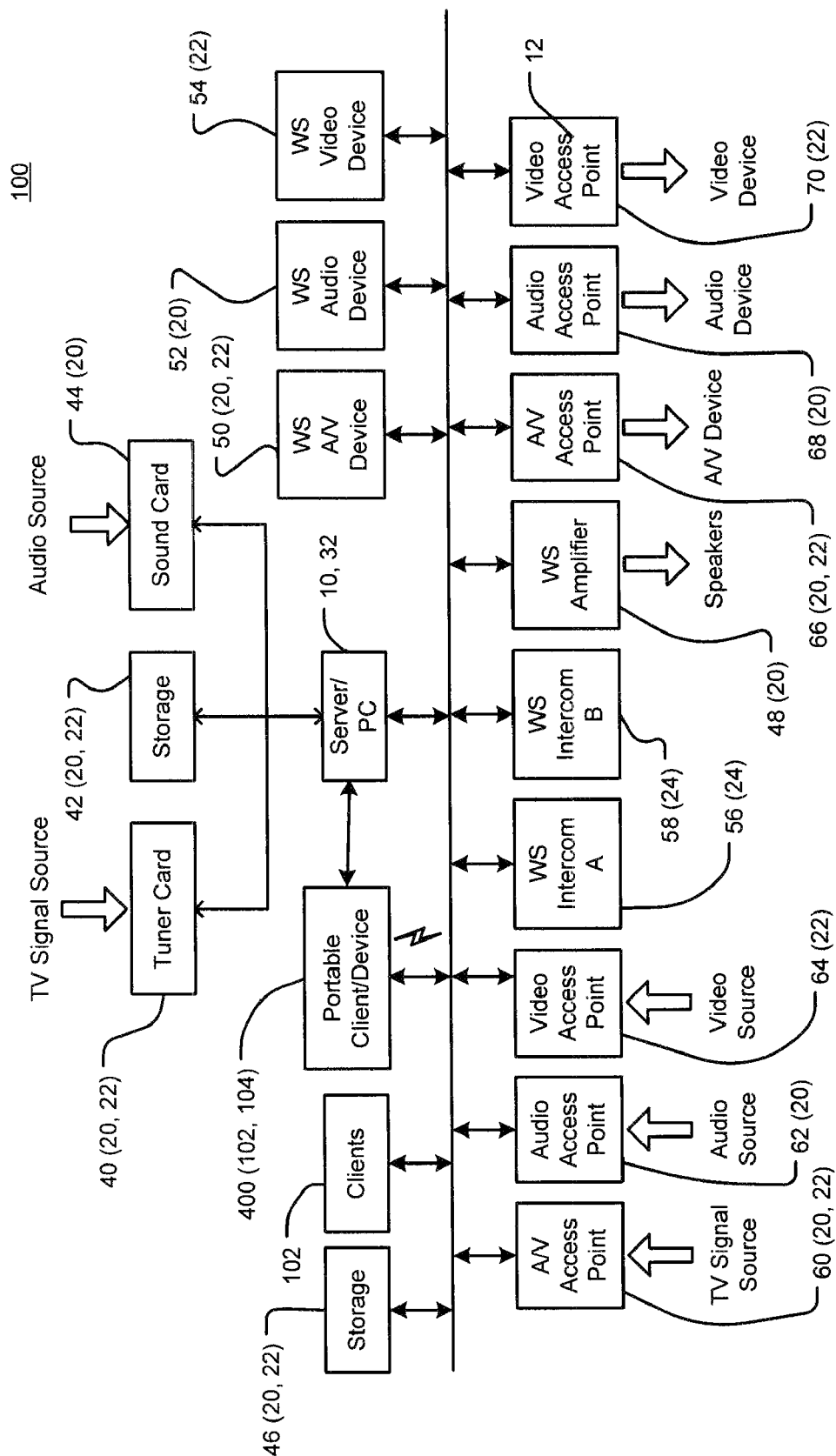
FIG. 3 shows a detailed view of the CAS and the portable device of FIG. 1 constructed according to the principles of the invention.

FIG. 3 shows a detailed view of the CAS 100 of FIG. 1, constructed according to the principles of the invention. As shown therein, media devices, such as the audio device 20, video device 22 and intercom system 24 of FIG. 1, may be any type of devices configured to receive, store, transfer and play media files or signals. For example, a tuner card 40, storage 42, and sound card 44 are connected to the sever 10 or alternatively/additionally a PC 32. The tuner card 40 is connected to a TV signal source such as an antenna, cable box, satellite receiver, or the like, and may provide a TV signal to any of the devices 102 connected to the network 12. The tuner card 40 may convert the TV signal from an analog format to a digital format. A storage 42 may be a hard disk drive, memory card/reader, CD/DVD ROM driver, MP3 player, or the like, and stores, at least for example, digital audio/video content. The sound card 44 is connected to an audio signal source such as a microphone, audio player, or the like, and may provide an audio signal from the audio signal source to any of the devices connected to the network 12. The sound card 44 may convert the audio signal from the analog format to the digital format.

Although FIG. 3 shows the tuner card 40, storage 42 and sound card 44 connected to the sever 10, these devices may be connected to the network 12 via different devices or connected directly to the network 12. For example, a storage 46, such as a network storage, may be directly connected to the network 12. The portable device 400 may be configured to perform the functions of both the devices 102 and clients 104, which will be explained further later.

The media devices implemented with Web Services may be directly connected to the network 12. For example, a Web Services (WS) enabled amplifier 48, WS audio/video (A/V) device 50, WS audio device 52 and WS video device 54 may be directly connected to the network 12, and a user may control these devices 50, 52, 54 from any of the clients 104. For example, by using the TV 30 located in a living room and its remote control 39 (both shown in FIG. 1), the user may select an MP3 file stored in the storage 42 or 46 in a child's room and play the file through the WS audio device 52 in a dining room or the WS amplifier 48 in the living room. Also, by using the controller 36, the user may select the TV signal received by the tuner card 40 located in a basement and play the TV signal through the WS A/V device 50, such as a TV, located in a bed room. Thus, according to the invention, the user may access any type of media files or signals whenever and wherever he or she wants.

For those media devices that are not implemented with Web Services, access points may be used to connect those devices to the network 12. For example, if a TV signal source and the tuner card 40 are located in separate rooms, an A/V access point 60 implemented with Web Services may be used to connect the TV signal source to the network. The A/V access point 60 may be equipped with a tuner card and connected to the network 12 wirelessly.

Similarly, an audio source 62 and video source 64 may be connected to the network 12 via an audio access point 62 and video access point 64, respectively. While the access points 60, 62, 64 may be used to interface between the media sources (e.g. TV, audio and video signal sources, and the like), the same access points may be used as media playback devices (e.g. TV, stereo system, video monitor, and the like). For example, an A/V access point 66 implemented with Web Services may provide a TV with a TV signal received from the tuner card 40 or the TV signal received from the A/V access point 60. An audio access point 68 may provide an audio playback device with a MP3 file stored in the storage 46. A video access point 70 may provide a monitor with the video signal received from the video access point 64. By using the same operational principles of the audio access point 62 and 68, an intercom system may be similarly implemented to provide intercom audio between two devices/clients.

As mentioned above, the portable device 400 may be configured to perform as both the device 102 and the client 104. For example, the portable device 400 may be configured to control at least one of the devices 102 and perform one of the services that are usually performed by the devices 102. The services may include a media service, a communication service, lighting service, security service, HVAC service and the like. Particularly, the communication service may include an intercom service, an email service, web browsing service, VoIP phone service and the like.

This multiple functionality of the portable device 400 may be achieved by using the Web Services and other functions such as Microsoft Windows XP Media Center Edition™ functionality, a user may use the portable device 400 as a remote controller, a media player and a communication device. Alternatively or additionally, if the server 10 or the PC 32 is running a SideShow™ enabled operating system such as Microsoft Windows Vista™, the portable device 400 may be configured as a SideShow™ device or "gadget." A SideShow™ device or gadget may communicate with any client or device implemented with Web Service for Device (WSD) in the network via protocols according to SideShow™ XML communication specifications. Moreover, the server 10 or the PC 32 using Microsoft Windows Vista™ may be running a SideShow™ gadget application running on the Microsoft Windows Vista™ computer providing a user interface rendering for the portable device 400 that communicates with the devices 104 via web service for devices technology. This configuration may also be implemented in the remote control 39. For example, the remote control 39 may be configured to control the TV 32 and/or the PC 32 while also functioning as a media player and/or an intercom terminal.

Figure 4:
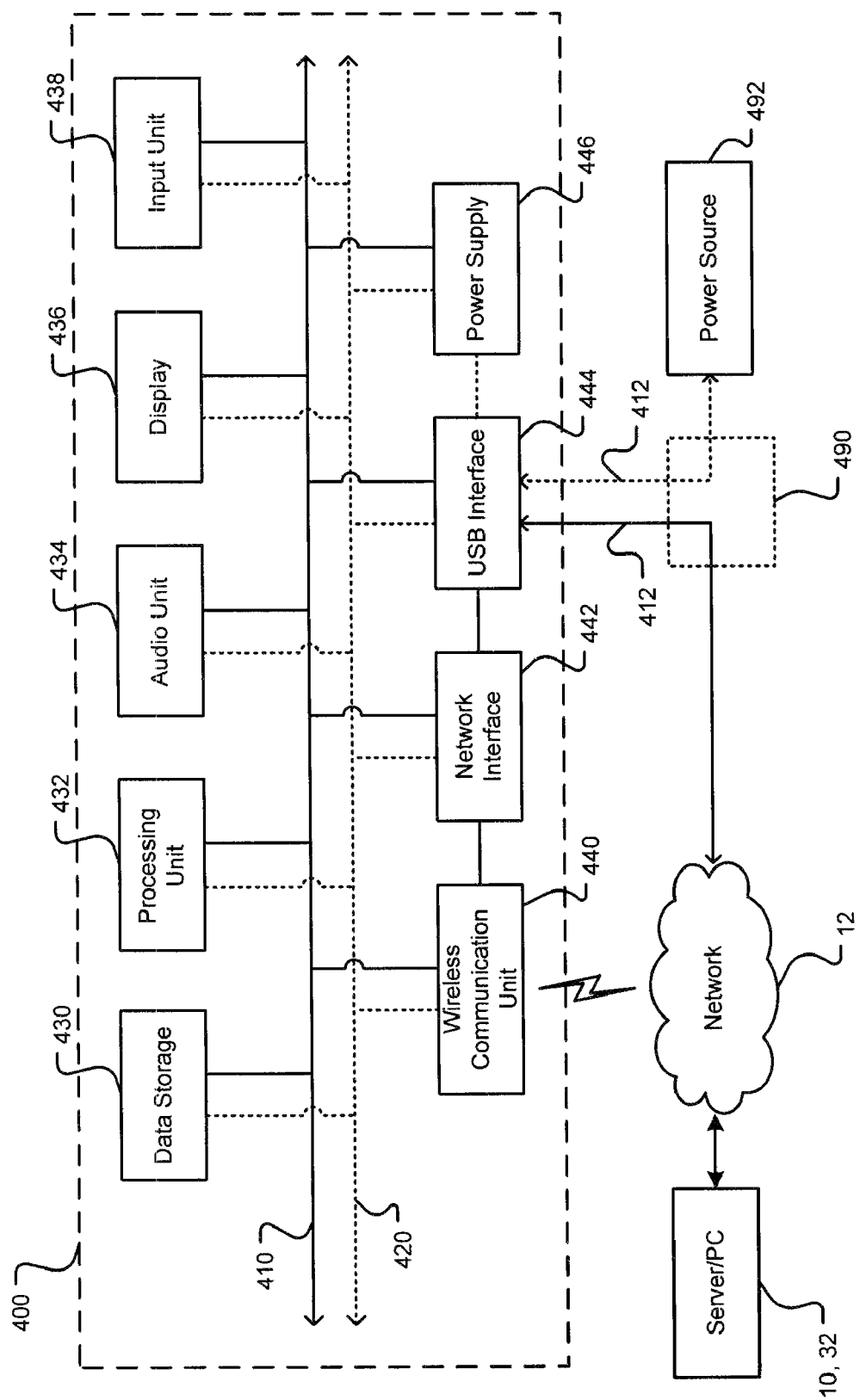
FIG. 4 shows an exemplary configuration of the portable device of FIGS. 1 and 3 constructed according to the principles of the invention.

FIG. 4 shows an exemplary structural overview of the portable device 400 of FIGS. 1 and 3 constructed according to the principles of the invention. The portable device 400 may include a data bus 410, a power supply line 420, a data storage 430, a processing unit 432, an audio unit 434, a display 436, an input unit 438, a wireless communication unit 440, a network interface 442, a USB interface 444 and a power supply 446. However, as skilled artisan will readily recognize, without departing from the scope and/or spirit of the invention, the portable device 400 may be implemented in other/additional configurations with other/additional components.

The portable device 400 may be configured to control the CAS 100 wirelessly via the network interface 442 and the wireless communication unit 440 (Bluetooth and/or Wireless Ethernet (WiFi 802.11(x) via the network 12 implemented as a WLAN). Alternatively, the USB interface 444 may be used to connect the portable device 400 to the network 12 via a USB cable 412. The USB cable 412 may be connected to the server 10 or the PC 32, or, alternatively, any of the devices 102 or the clients 104 equipped with a USB port, for controlling the devices 102 and/or exchanging data with any of the server 10, the devices 102 and the clients 104 for communication and/or media consumption. For example, the USB interface 442 may be connected to the network interface 442 to establish a wired connection with the network 12 via the USB cable 412. The portable device 400 may also include a docking station 490 to support the portable device 400 to connect to the network 12, the PC 32 or a power source 492.

The USB interface 44 may also be used to power and/or charge the portable device 400. For example, as shown in FIG. 4, the USB interface 444 may be linked to the power supply 446, which may be configured to provide the power to other components of the portable device 400 via the power supply line 420. The power supply 446 may include a rechargeable battery 480 (shown in FIG. 6). To conserve the power consumption, the portable device 400 may be configured to enter a sleep mode. More specifically, the portable device 400 may be configured to automatically enter a sleep mode if the portable device 400 is not used for a predetermined time (e.g., 60 seconds), which may be adjusted by the user. Additionally or alternatively, the portable device 400 may be configured to enter the sleep mode manually. For example, the user may navigate an on-screen menu displayed on the display 436 to find a sleep mode command and activate the sleep mode command by using the input unit 438 to enter the sleep mode instantly, as well known in the art. Alternatively, the portable device 400 may be configured to enter the sleep mode via a voice command function. The use of voice command as a control is well known in the art. The portable device 400 may have several sleep modes and each sleep may offer a different level of available functionality and power consumption. For example, the portable device 400 may retain certain functions with an associated power consumption in a normal sleeping mode, and fewer functions and a lower power consumption in a deep sleep mode.

The portable device 400 may be further equipped with the data storage 430. The data storage 430 may be used for storing various data such as, for example, audio files, video files, digital image files, text files and the like. In an embodiment, the data storage 430 may include a removable data storage medium 472 (e.g., compact flash memory card, SD memory, or so on) shown in FIGS. 5 and 6. The portable device 400 may be configured to download any files from any of the server 10, the devices 102 and the clients 104 and store the downloaded files in the removable data storage medium 472. Of course, the user may download files to the removable data storage medium 472 from other sources. For example, as well known, the user may download media files directly from the PC 32 to the removable data storage medium 472, insert the removable data storage medium 472 to the portable device 400 and control the portable device 400 to play the media files via the audio unit 434 and/or the display 436.

The display 436 may display information necessary to control the devices 102. For example, the portable device 400 may be configured with a graphic user interface that allows the display 436 to display a menu system for controlling various functions of the portable device 400. The display 436 may also be configured to display images, video clips and the like, that may be streamed from the network 12 or stored in the data storage 430. The display 436 may include a flat panel display (e.g., liquid crystal display, plasma display and the like). Optionally, the display 436 may include a touch screen (not shown) for easier menu navigation and selection, as well known in the art. In an embodiment, the display 456 may be a 2.5" LCD screen with a backlight assembly supporting both portrait and landscape display formats at 240×320 or 320× 240 resolution. Other type of displays and/or arrangements are also contemplated according to the principles of the invention.

The audio unit 434 may be used to convert an audio file in a digital format to an analog format, amplify the converted the audio file and output the amplified audio file via a speaker or headphones. The audio unit 434 may also be configured to receive a voice signal from the user and convert the voice signal to a digital format for transfer to the network 12 such that the portable device 400 may be used as a communication device, such as the intercom 24, a VoIP phone or other types of IP based communication devices.

The input unit 438 may be one or combination of a key pad, a scroll wheel, a touch screen, or any other input devices capable of receiving the user input. In the case the portable device 400 is capable of voice recognition, the audio unit 434 may also be used as the input unit 438. The processing unit 430 may be configured to control the overall operation of the portable device 400. For example, the processing unit 430 may include a ARM7, 200 MIPS dual-core chipset, its equivalent or any future equivalent thereof, to run Microsoft™ Mini Common Language Runtime™ (CLR) as the operating system to take advantage of the .NET microframe work. As noted above, the portable device 400 may leverage Microsoft Windows Vista™ SideShow™ platform technology, which allows a user to create "gadgets" inside of Windows Vista™ and then transmit information via XML to low-power sideshow display screens.

Figure 5:
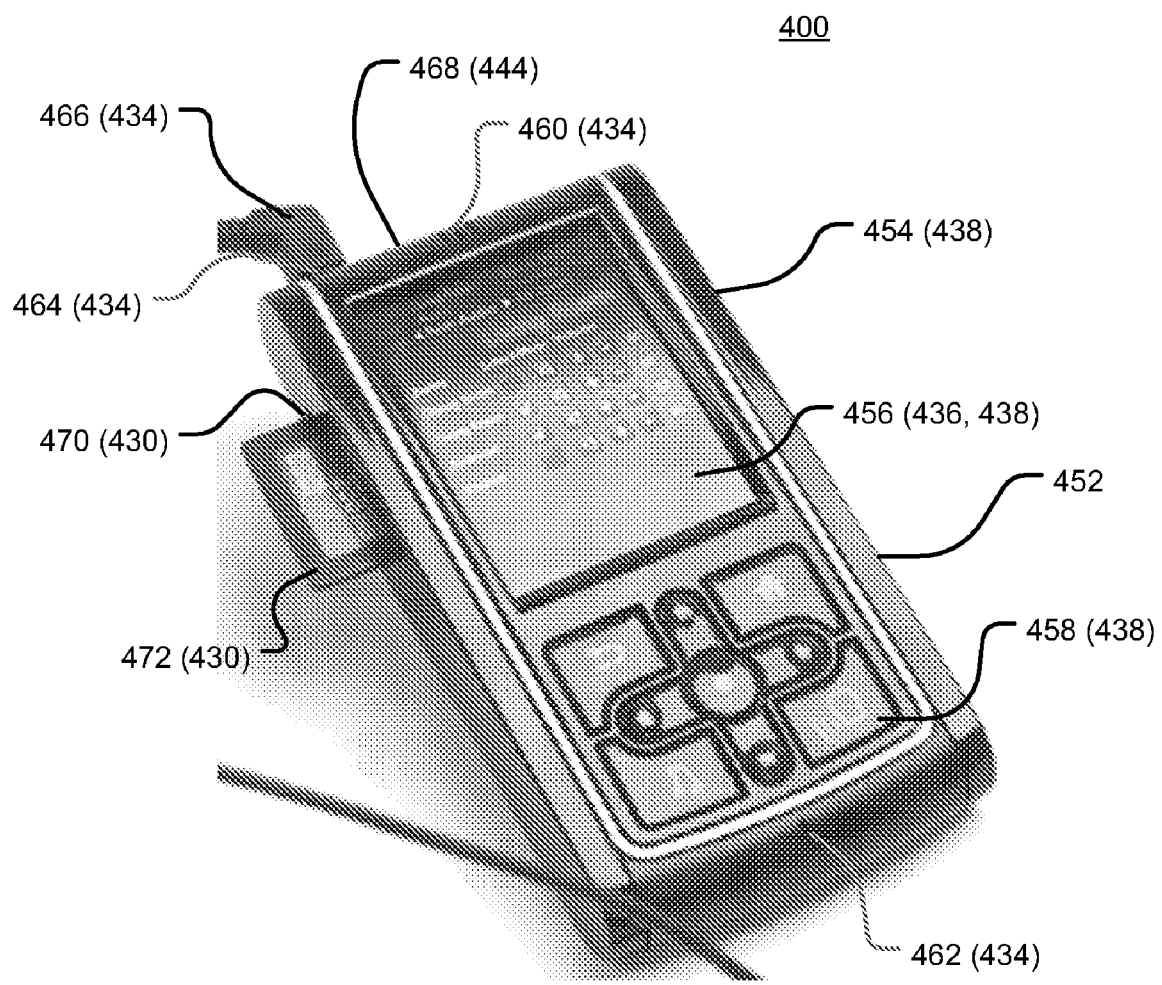
FIG. 5 shows a perspective view of the portable device of FIG. 3 constructed according to the principles of the invention.
Figure 6:
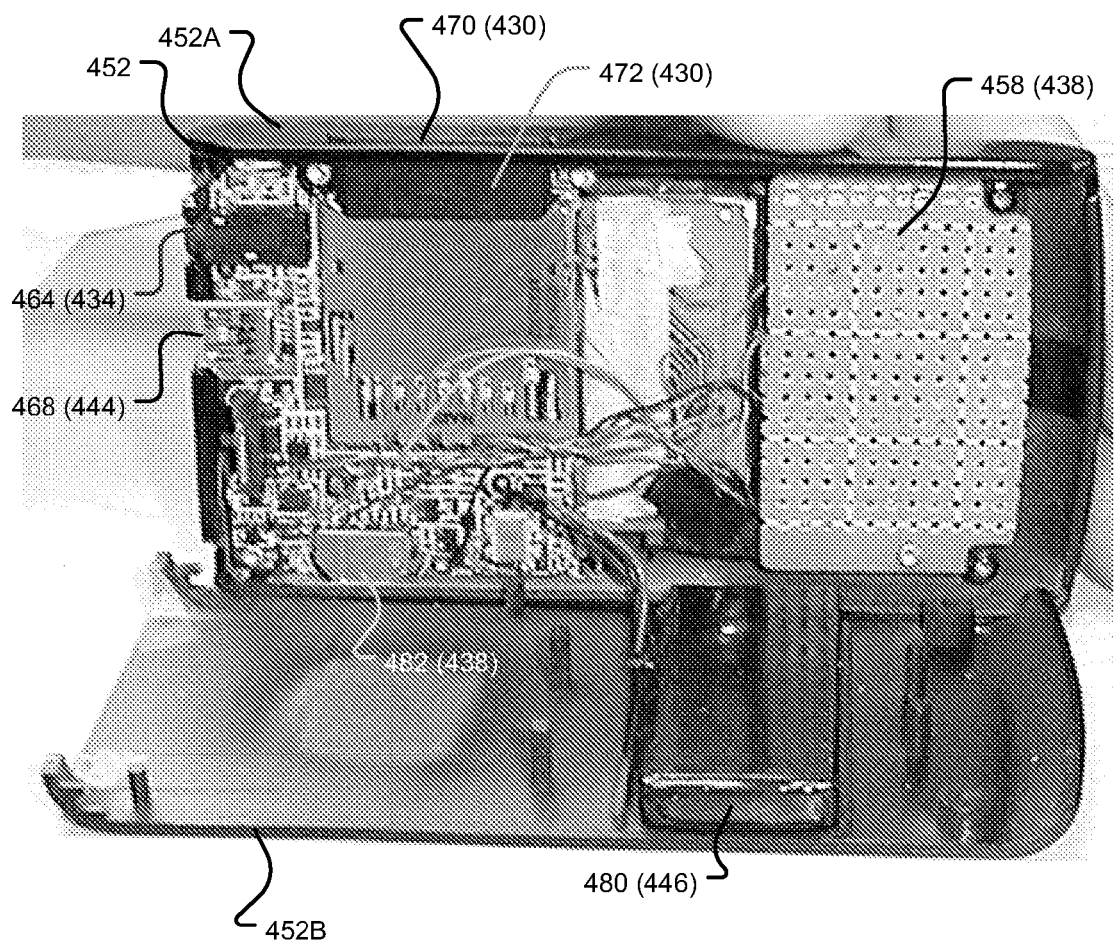
FIG. 6 shows an inner configuration of the portable device of FIG. 5 constructed according to the principles of the invention.

FIGS. 5 and 6 shows an exemplary implementation of the portable device 400 constructed according to the principles of the invention. FIG. 5 is a perspective view of the portable device 400. The portable device 400 may be configured with a case 452, a scroll wheel 454 (arranged on the side and now shown), a screen 456, a keypad 458, a speaker 460, a microphone 462, a headphone jack 464, a USB port 468 (arrange on top and not shown) and a removable storage media slot 470. However, as a skilled artisan will readily recognize, without departing from the scope and/or spirit of the invention, the portable device 400 may be implemented in other or additional configurations.

The case 452 may be configured to be portable and strong enough to maintain the structural integrity of the portable device 400 and to protect the components thereof. For example, the device may be light weight and may be approximately 10.3 cm long by 5.5 cm wide and 1.5 cm thick. The screen 456 and the keypad 458 may be arranged on the same side of the portable 400 such that the user can see the information displayed on the screen 456 and make selection using the key pad 458. As shown in FIG. 5, the keypad 458 may include several buttons that allows the user to navigate and/or select a desired operation from the control menu displayed on the screen 456. For example, the keypad 458 may include standard up, down, left, right, enter, back navigation buttons, as well as one or more short-cut buttons for specific functions such as music, home control or voice communications.

The speaker 460 and the microphone 462 may also be formed on the same side of the portable device 400 with an appropriate distance such that when the portable device 400 is used as a communication device (e.g., intercom unit or VoIP phone unit), the speaker 460 and the microphone 462 match the locations of the user's ear and mouth, respectively. The speaker 460 may be configured to be loud enough to perform a speaker phone function, as well known in the art. The headphone jack 464 may be provided to connect headphones 466 to the portable device 400.

As mentioned above, the USB port 468 may be provided to connect the portable device 400 to the network 12 and/or provide the power to the portable device 400. The portable device 400 may be recharged through a charger, such as dockable charger implemented in the docking station 490. The removable storage media slot 470 may be configured to receive a removable storage media 472. As shown in FIG. 6, the portable device 400 may be configured such that the removable storage media 472 may be entirely inserted into the space behind the screen 456 via the removable storage media slot 470. The scroll wheel 454 may be provided for quicker access of the control menu display on the screen 456, as well known in the art. Also, the scroll wheel 454 may be used to control volume of the audio signal output from the speaker 460 and/or the headphones 466.

FIG. 6 shows the inner configuration of the portable device 400. As shown therein, the case 452 may be a combination of a front case 452A and a rear case 452B. The majority of the components may be attached to the front case 452A while a battery 480 is attached to the rear case 452B for easier replacement. The battery 480 may be a rechargeable lithium ion battery. However, the battery 480 may, instead, be any types of battery, as the skilled artisan will readily recognize and appreciate, without departing from the scope and/or spirit of the invention.

The portable device 400 shown in FIGS. 5 and 6 may be operated in numerous known ways. In particular, the headphone jack 464 may be used to provide all audio output for music, audio/video, intercom, and phone service such as VoIP phone service. Similarly, the speaker 460 may be used to provide an audio output for the same sources as with the headphone jack 464 discussed above. The memory card slot 470 may be configured to read the memory card 472. The memory card 472 may be used to store various media files including audio files and video files, such as MP3 files. Moreover, the memory card 472 may be used to transfer, update or store other operating files. Navigation through the operating system or interface of the portable device 400 may be through the keypad 458 previously described and moreover, may be navigated with the scroll wheel 454. Additionally, the device of FIGS. 3 and 4 may also include a touch screen or stylus interactive screen. The portable device 400 may further include internal memory such as a RAM or a ROM and the like to store various operating systems and may further include further structure to implement the functionality as described herein.

Although a particular layout and set of features is shown in the embodiment of FIGS. 5 and 6 any combination features including more or less features, and any arrangement of the screen and outer housing is contemplated by the invention. Moreover, although specific protocols and operating systems are described with respect to the invention, any future enhancement to these protocols or any future protocols are contemplated by the invention.

The various embodiments of the invention described herein are intended for operation as software programs running on a computer processor. Furthermore, alternative software implementations including, but not limited to, distributed processing, component/object distributed processing, parallel processing, and/or virtual machine processing may be employed. Furthermore, although reference is made to exemplary software applications and operating systems, any future enhancements, or any future protocols, applications, or operating systems may be used to implement the invention described herein.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A convergence and automation system, comprising:
    an Internet Protocol (IP) based network;
    a plurality of devices connected to the network, each device being configured to perform at least one of a plurality of services;
    a server connected to the network and configured to control the devices to converge and automate the plurality of services thereof according to a Web Services for Devices (WSD) protocol; and
    a portable device connected to the network and configured to control at least one of the plurality of devices and perform at least one of the plurality of services,
    wherein the server is further configured to collect information necessary for controlling the at least one of the plurality of devices and provides the collected information to the portable device,
    wherein the WSD protocol comprises:
        a first communication layer configured to logically interface the portable device;
        a second communication layer configured to physically interface the plurality of devices; and
        a service provider layer comprising one or more components provided corresponding to one or more device categories, respectively, each component including at least one of the plurality of devices of the same device category,
    wherein each component comprises:
        one or more Web Services provided corresponding to one or more of the plurality of devices of the corresponding device category, respectively, each Web Service configured to function as a Web Service host for the corresponding device;
        one or more device bridges provided corresponding to the one or more Web Services, respectively, each device bridge configured to translate communication between the corresponding Web Service and device; and
        a controller configured to communicate with the one or more of the plurality of devices of the corresponding device category, and
    wherein the portable device comprises a dual core-based chipset and the server is implemented with Windows sideshow to provide the collected information to the portable device.

2. The convergence and automation system of claim 1, wherein the at least one of the plurality of services comprises at least one of a media service, communication service, lighting service, security service and HVAC service.

3. The convergence and automation system of claim 2, wherein the communication service comprises at least one of an intercom service, email service, web browsing service and a VoIP phone service.

4. The convergence and automation system of claim 1, wherein each of said plurality of devices is selected from the group consisting of an audio device, video device, intercom device, lighting control device, security device and HVAC device.

5. The convergence and automation system of claim 1, further comprises at least one client connected to the network and configured to control at least a portion of the services of the devices,
    wherein the first communication layer of the WSD protocol is further configured to logically interface the at least one client.

6. The convergence and automation system of claim 5, wherein the at least one client is selected from the group consisting of a television, personal computer, personal data assistant and remote control.

7. The convergence and automation system of claim 1, wherein the portable device connected to the IP network wirelessly.

8. The convergence and automation system of claim 1, wherein the portable device is connected to the IP network via a universal serial bus (USB) connection.

9. The convergence and automation system of claim 8, further comprises a docking unit configured to charge the portable device and establish the USB connection between the IP network and the portable device.

10. A portable device in communication with a server via an Internet Protocol (IP) based network and configured to perform at least one of a plurality of services and control at least one of a plurality of devices, each device configured to perform at least one of the plurality of services, the server configured to converge and automate the plurality of services according to a Web Services for Devices (WSD) protocol, collect information for controlling the plurality of devices and provide the collected information to the portable device, the portable device comprising:
    a processing unit comprising a dual core-based chipset;

a network interface unit configured to connect the portable device to the network;

a video unit configured to display the information from the server;

an audio unit configured to generate a sound when required for performing the at least one of the plurality of the services; and an input unit configured to receive a user's input for performing the at least one of the plurality of services and controlling at least one of the plurality of devices, wherein the WSD protocol comprises:
- a first communication layer configured to logically interface the portable device;
- a second communication layer configured to physically interface the plurality of devices; and
- a service provider layer comprising one or more components provided corresponding to one or more device categories, respectively, each component including at least one of the plurality of devices of the same device category, wherein each component comprises:
- one or more Web Services provided corresponding to one or more of the plurality of devices of the corresponding device category, respectively, each Web Service configured to function as a Web Service host for the corresponding device;
- one or more device bridges provided corresponding to the one or more Web Services, respectively, each device bridge configured to translate communication between the corresponding Web Service and device; and
- a controller configured to communicate with the one or more of the plurality of devices of the corresponding device category, and wherein the server is implemented with Windows sideshow to provide the collected information to the portable device.

11. The portable device of claim 10, wherein the at least one of the plurality of services comprises at least one of a media service, a communication service, a lighting service, a security service and a HVAC service.

12. The portable device of claim 10, wherein the communication service comprises at least one of an intercom service, email service, web browsing service and a VoIP phone service.

13. The portable device of claim 10, wherein further comprising a wireless communication unit for connecting the network interface unit to the network wirelessly.

14. The portable device of claim 10, further comprising a universal serial bus (USB) port connected to the network interface unit for connecting the network interface unit to the network.

15. The portable device of claim 14, further comprising a power supply unit configured to receive a power from an external power source via the USB port.

16. The portable device of claim 15, wherein the power supply unit comprises a rechargeable battery.

17. The portable device of claim 15, further comprising a housing configured to engage a docking unit provided for at least one of connecting the portable device to the network and receiving the power from the external power source.

18. The portable device of claim 10, wherein the input unit comprises at least one of a keyboard and a touch screen.

19. The portable device of claim 10, wherein the audio unit comprises at least one of a microphone, a speaker and a headphone Jack.

20. The portable device of claim 10, further comprising a data storage unit.

21. The portable device of claim 20, wherein the data storage unit comprises a removable data storage media.

22. The portable device of claim 10, wherein the portable device is configured to automatically or manually enter a sleep mode.

* * * * *